United States Patent [19]

Denz et al.

[11] Patent Number: 5,553,577
[45] Date of Patent: Sep. 10, 1996

[54] APPARATUS FOR CHECKING THE TIGHTNESS OF A TANK VENTING SYSTEM

[75] Inventors: Helmut Denz, Stuttgart; Andreas Blumenstock, Ludwigsburg, both of Germany

[73] Assignee: Robert Bosch GmbH, Stuttgart, Germany

[21] Appl. No.: 316,459

[22] Filed: Sep. 30, 1994

[30] Foreign Application Priority Data

Oct. 15, 1993 [DE] Germany ............. 43 35 126.3

[51] Int. Cl.⁶ .................................... F02M 37/04
[52] U.S. Cl. ............................. 123/198 D; 123/520
[58] Field of Search .................. 123/520, 521, 123/518, 519, 516, 198 D; 417/380, 384, 385

[56] References Cited

U.S. PATENT DOCUMENTS

| | | | |
|---|---|---|---|
| 2,753,804 | 7/1956 | Goss | 417/384 |
| 4,085,586 | 4/1978 | Shibata | 417/380 |
| 4,086,897 | 5/1978 | Tamura | 123/520 |
| 4,463,554 | 8/1984 | Sodeck | 417/380 |
| 5,056,493 | 10/1991 | Holzer | 123/520 |
| 5,146,902 | 9/1992 | Cook | 123/198 D |
| 5,261,379 | 11/1993 | Lipinski | 123/198 D |
| 5,349,935 | 9/1994 | Mezger | 123/198 D |
| 5,363,828 | 11/1994 | Yamashita | 123/198 D |
| 5,383,438 | 1/1995 | Blumenstock | 123/198 D |

FOREIGN PATENT DOCUMENTS 4003751  8/1991  Germany .

*Primary Examiner*—Carl S. Miller
*Attorney, Agent, or Firm*—Edwin E. Greigg; Ronald E. Greigg

[57] ABSTRACT

An apparatus for checking a tank venting system for leaks that serves to vent a fuel tank of a motor vehicle whose engine has a intake tube. The apparatus has an absorption filter connected to a ventilation line, which can be closed by means of a shutoff valve, and pressure producing devices for the production of an overpressure in the fuel tank. The pressure producing devices are embodied as actuatable by means of the vacuum in the intake tube in order to be able to forego the separate electromechanical drive devices for the pressure producing devices which have been necessary in the prior art.

18 Claims, 1 Drawing Sheet

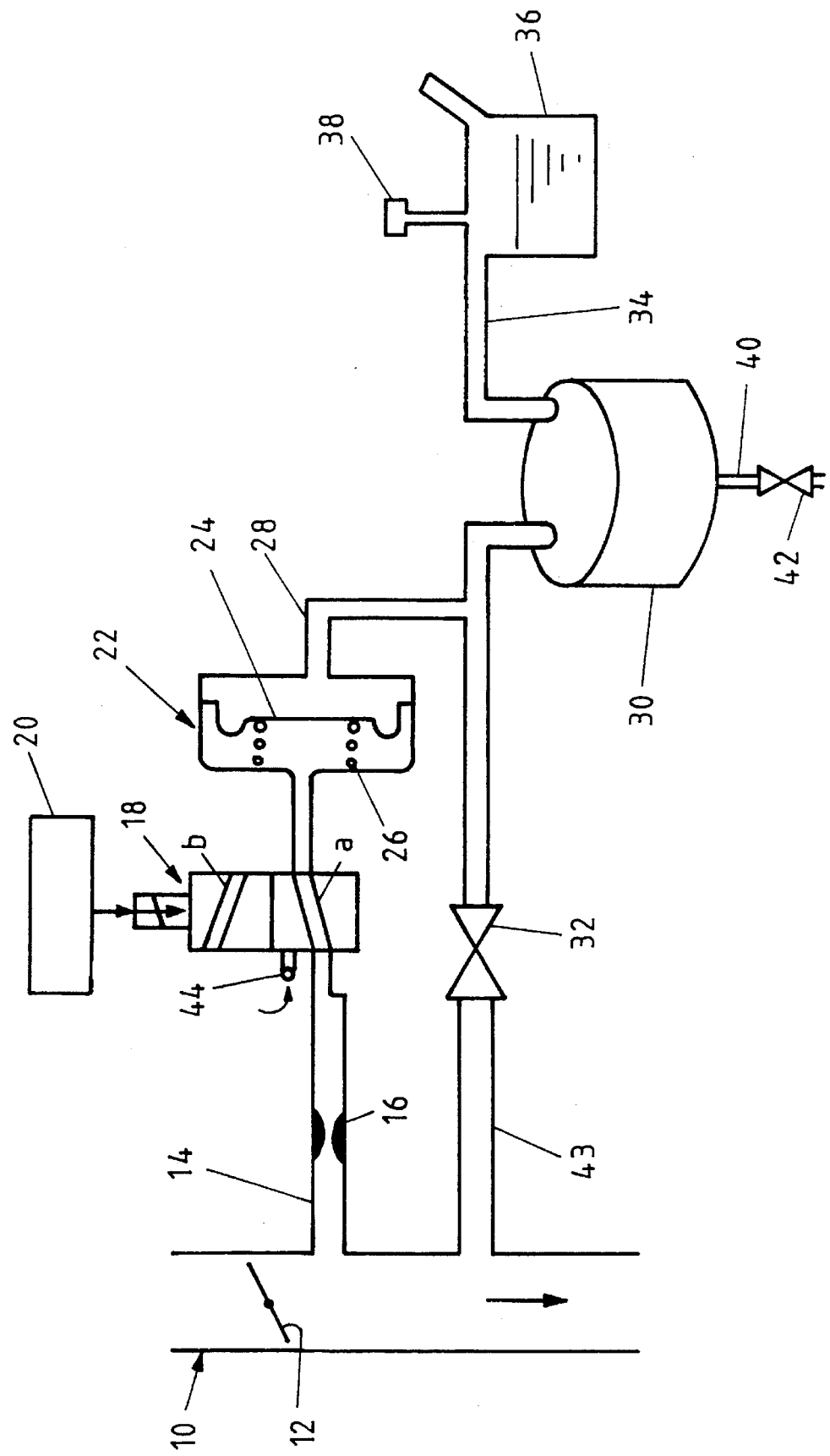

5,553,577

APPARATUS FOR CHECKING THE TIGHTNESS OF A TANK VENTING SYSTEM

BACKGROUND OF THE INVENTION

The invention is related to an apparatus for checking the tightness of a tank venting system that serves to vent a fuel tank of a motor vehicle whose internal combustion engine has an intake tube, or in other words checking the system for leaks.

It is known that checking for a leak in a tank venting system can be achieved by working with an overpressure or a vacuum; according to German Patent 40 03 751A1, these pressures depend on the operating requirements. It is further known that for leak checking the tank system, an overpressure can be produced with the help of an electrically actuated reciprocating piston or by means of a special air pump.

In the systems in which a vacuum or an overpressure occurs, depending upon the operating requirements of the engine having the tank to be checked, it is, at least as concerns the production of an overpressure, frequently not possible to easily bring about the proper operating requirements for producing an overpressure. On the other hand, in check systems working with a reciprocating piston or an air pump, an additional technical expenditure is required which results in higher cost and/or an increased susceptibility to failure of the entire system.

OBJECT AND SUMMARY OF THE INVENTION

Based on the prior art and the above indicated problems, the basis of the present invention is the task of improving an apparatus according to the invention for leak checking tank venting systems to the effect that by doing without separate, active, actuating or pressure producing devices, that is, by forgoing a special drive motor, as is required for example for a pump, and by foregoing electromechanical actuating devices, such as the above mentioned reciprocating piston, a leak check can be carried out depending on an overpressure produced in the fuel tank.

The device according to the invention has the special advantage that in the operation of an engine, a vacuum is normally available at all times with no trouble and hence the conditions exist for the production of the desired overpressure for the concerted overpressure check of a tank venting system.

It has been proven to be advantageous in embodying the invention if the pressure producing devices include an element which, when the engine is running can be switched away from an initial position against a restoring tension by means of a vacuum in the intake tube, which element, upon interruption of the vacuum, can be returned toward its initial position by means of the restoring tension to produce an overpressure in the fuel tank when the shutoff vale is closed; the switchable element can be a piston, for example, however it is preferably embodied as a switchable diaphragm which is mounted in a pressure tight housing as a dividing element between a chamber that communicates with the tank and a chamber that communicates with the intake tube.

The invention will be better understood and further objects and advantages thereof will become more apparent from the ensuing detailed description of a preferred embodiment taken in conjunction with the drawing.

BRIEF DESCRIPTION OF THE DRAWING

The sole FIGURE of the drawing is a schematic representation of an embodiment of an apparatus for leak checking a tank venting system by producing an overpressure in said system.

DESCRIPTION OF THE PREFERRED EMBODIMENT

In particular, the drawing shows an intake tube 10 having a throttle valve 12, via which an engine, not shown, is supplied with combustion air in the flow direction indicated by means of an arrow. Downstream from the throttle valve 12 a line 14, in which preferably a restriction nozzle 16 is disposed, branches off from the intake tube 10. Downstream of the restriction nozzle 16, the line 14 is connected to a reversing valve in the form of a three-way valve 18, which can be actuated with the help of a control device 20. A diaphragm box 22 is located downstream of the valve 18, which box has a pressure tight housing, in which a diaphragm 24 is disposed as a dividing element, which is prestressed by means of a pressure spring 26 toward an outlet side connection 28 of the diaphragm box. The connection 28 is attached on the one side to an absorption filter 30, in particular an activated charcoal filter, and on the other side to the intake tube 10 via a regenerating valve 32. A second connection 34 of the absorption filter 30 leads to a tank 36 to which a pressure sensor 38 is attached. A third connection 40 of the absorption filter 30 communicates via an additional shutoff valve 42 with the atmosphere or if need be another suitable scavenging air source so that for regeneration of the filter 30, a scavenging air flow can be produced in it, which picks up fuel vapors from the filter material and when the regenerating valve 32 is open, introduces them into the intake tube 10 via a purging line 43.

The apparatus shown in the drawing works as follows: during driving operation or when the engine is running, the three-way valve 18 assumes the position shown, in which the junction a connects the line 14 to the diaphragm box 22. By means of this connection, the vacuum prevailing in the intake tube 10 inside the diaphragm box 22 acts upon the side of the diaphragm 24 oriented toward the valve 18, so that the diaphragm is switched against the tension of the pressure spring 26—toward the left in the drawing. If at this point, a leak check should be conducted with regard to the tank 36, then the valves 32 and 42 are closed. At the same time, the valve element of the reversing valve 18 is adjusted with the aid of the control device 20 to switch from junction to junction so that, via the junction of the valve 18, ambient air from a connection 44 of the valve 18 reaches the left side of the diaphragm 24 so that the first prevailing vacuum there is reduced to atmospheric pressure. This results in a switching of the diaphragm 24 toward the outlet side connection 28 of the diaphragm box 22, under the influence of the pressure spring 26. This switching of the diaphragm 24 results in a pressure buildup in the closed system having the absorption filter 30 and the tank 36 so that now an overpressure prevails in the tank 36, which can be detected with the help of the pressure sensor 38 and can be checked in its course.

As is clear in the previous description of the apparatus according to the invention shown in the drawing, it is a particular advantage of this apparatus that the overpressure necessary for a leak check can be produced without the use of special electromechanical drive devices. Instead the use of a reversing valve 18 that communicates with a diaphragm box 22 is sufficient.

As is also clear in the previous description of the apparatus according to the invention, the overpressure produced in the tank 36 by a leak check is greater when the tank is full than when it is empty. In a tight system, this fact is not critical since the first overpressure produced does not decrease. On the other hand, when there is a leak, the size of the leak can be determined depending on the overpressure decrease gradient. This overpressure decrease gradient, however, depends on the absolute value of the first overpressure produced and hence depends on the level of the tank. That is why to safeguard the values obtained from the leak check, the height of the absolute value of the first overpressure produced is taken into account.

Since in a completely empty tank the case can also be that the stroke of the diaphragm or the size of the volume displaced by the diaphragm is not adequate to produce an acceptable overpressure, it can be further advantageous to first ascertain the level of the tank before a leak check and depending on the initial signal of a corresponding tank level sensor, to allow a leak check only above a predetermined filling height of the tank. Since an overpressure can also be produced by means of evaporating fuel in the tank or since a decrease of the overpressure produced in the described manner can be prevented, it can be additionally advantageous not to carry out the leak check at a time in which there is the danger of an evaporation of the fuel. For example the engine temperature or the tank venting adaption factor can be consulted as a measure for the risk of the existence of such a condition.

Finally, in the event of a leaky diaphragm 24, hydrocarbon fumes can escape from the tank system into the intake tube 10 in an uncontrolled manner. To prevent this, the exemplary embodiment is provided with the restriction nozzle 16, whose opening can be designed as very narrow, since there is a lot of time to produce the vacuum on the left side of the diaphragm in the drawing and since a large amount of air flow per unit of time is not necessary.

In lieu of communicating with the intake tube 10, the line 14 can also communicate with a vacuum chamber that serves as a vacuum source so that the vacuum of this vacuum source acts on the interior of the diaphragm box 22. Vacuum chambers of this kind in the vehicle serve to aid in switching and the like. The vacuum in the vacuum chamber is produced by means of a pump driven by the engine or by means of the vacuum in the intake tube.

To conclude, it should be noted that an important advantage of the apparatus according to the invention also lies in that the danger of explosion can be considerably reduced in comparison with the danger of explosion when an electromotor-type drive is used.

The foregoing relates to a preferred exemplary embodiment of the invention, it being understood that other variants and embodiments thereof are possible within the spirit and scope of the invention, the latter being defined by the appended claims.

What is claimed and desired to be secured by Letters Patent of the United States is:

1. An apparatus for checking the tightness of a fuel tank venting system, which serves to vent a fuel tank of a motor vehicle having an intake tube of an engine, an absorption filter connected to a ventilation line, a shutoff valve in said ventilation line which is closed during a fuel valve tightness check, a purging line which is closed by means of a regenerating valve during a fuel tank tightness check, and at least first and second pressure control devices for A production of an overpressure in the fuel tank, said at least first and second pressure control devices using only a fluid medium within the fuel tank venting system for producing pressure during fuel tank tightness check, the at least first pressure embodied as actuatable by means of a vacuum from a vacuum source control device (18) is actuatable to control an actuatable pressure on said at least one second pressure control device (22) from a vacuum source or from atmospheric pressure.

2. The apparatus according to claim 1, in which the vacuum source is embodied by means of the intake tube (10) of the engine.

3. The apparatus according to claim 1, in which the at least first and second pressure control devices include an element (24), which is switched out of an initial position by means of the vacuum of the vacuum source (10) in opposition to a restoring tension, which element (24), when the vacuum is interrupted, is returned toward its initial position by means of the restoring tension to produce an overpressure in the fuel tank (36) when the regenerating valve (32) and the shutoff valve (42) connected to the absorption filter are closed.

4. The apparatus according to claim 2, in which the at least first and second pressure control devices include an element (24), which is switched out of an initial position by means of the vacuum of the vacuum source (10) in opposition to a restoring tension, which element (24), when the vacuum is interrupted, is returned toward its initial position by mean of the restoring tension to produce an overpressure in the fuel tank (36) when the regenerating valve and the shutoff valve (42) connected to the absorption filter are closed.

5. The apparatus according to claim 3, in which the switchable element is embodied as a diaphragm (24), which is mounted in a pressure tight housing as a dividing element between a chamber which communicates with the fuel tank and a chamber which communicates with the vacuum source (10).

6. The apparatus according to claim 4, in which the switchable element is embodied as a diaphragm (24), which is mounted in a pressure tight housing as a dividing element between a chamber which communicates with the fuel tank and a chamber which communicates with the vacuum source (10).

7. The apparatus according to claim 5, in which the diaphragm (24) is associated with a restoring spring (26).

8. The apparatus according to claim 6, in which the diaphragm (24) is associated with a restoring spring (26).

9. The apparatus according to claim 5, in which a reversing valve (18) is provided by means of which the chamber, which communicates with the vacuum source, selectively communicates with the vacuum source (10) and with ambient air via a connection 44.

10. The apparatus according to claim 6, in which a reversing valve (18) is provided by means of which the chamber, which communicates with the vacuum source, selectively communicates with the vacuum source (10) and with ambient air via a connection 44.

11. The apparatus according to claim 7, in which a reversing valve (18) is provided by means of which the chamber, which communicates with the vacuum source, selectively communicates with the vacuum source (10) and with ambient air via a connection 44.

12. The apparatus according to claim 8, in which a reversing valve (18) is provided by means of which the chamber, which communicates with the vacuum source, selectively communicates with the vacuum source (10) and with ambient air via a connection 44.

13. The apparatus according to claim 1, in which a restriction nozzle (16) is provided between the at least first pressure control device (18), and the vacuum source (10).

14. The apparatus according to claim 2, in which a restriction nozzle (16) is provided between the at least first pressure control device (18), and the vacuum source (10).

15. The apparatus according to claim 3, in which a restriction nozzle (16) is provided between the at least first pressure control device (18), and the vacuum source (10).

16. The apparatus according to claim 5, in which a restriction nozzle (16) is provided between the at least first pressure control device (18), and the vacuum source (10).

17. The apparatus according to claim 7, in which a restriction nozzle (16) is provided between the at least first pressure control device (18), and the vacuum source (10).

18. The apparatus according to claim 9, in which a restriction nozzle (16) is provided between the at least first pressure control device (18), and the vacuum source (10).

* * * * *